INVENTOR
WILFRED FARNWORTH

United States Patent Office 3,403,942
Patented Oct. 1, 1968

3,403,942
PARTICULATE MATERIAL FEEDING APPARATUS FOR FLUID CONVEYOR LINES
Wilfred Farnworth, North Vancouver, British Columbia, Canada, assignor to Rader Pneumatics & Engineering Co., Ltd., Burnaby, Ontario, Canada
Filed Dec. 28, 1966, Ser. No. 605,294
4 Claims. (Cl. 302—49)

ABSTRACT OF THE DISCLOSURE

Apparatus for feeding particulate material into a fluid conveyor line and including a distributor casing adapted to be connected in the conveyor pipe line so that conveying fluid will travel along a longitudinal axis thereof, and a rotary feeder having a rotational axis extending at right angles to the casing axis and connected to the casing to direct particulate material into the latter in the direction of movement of conveying fluid therethrough.

---

Figure 1:
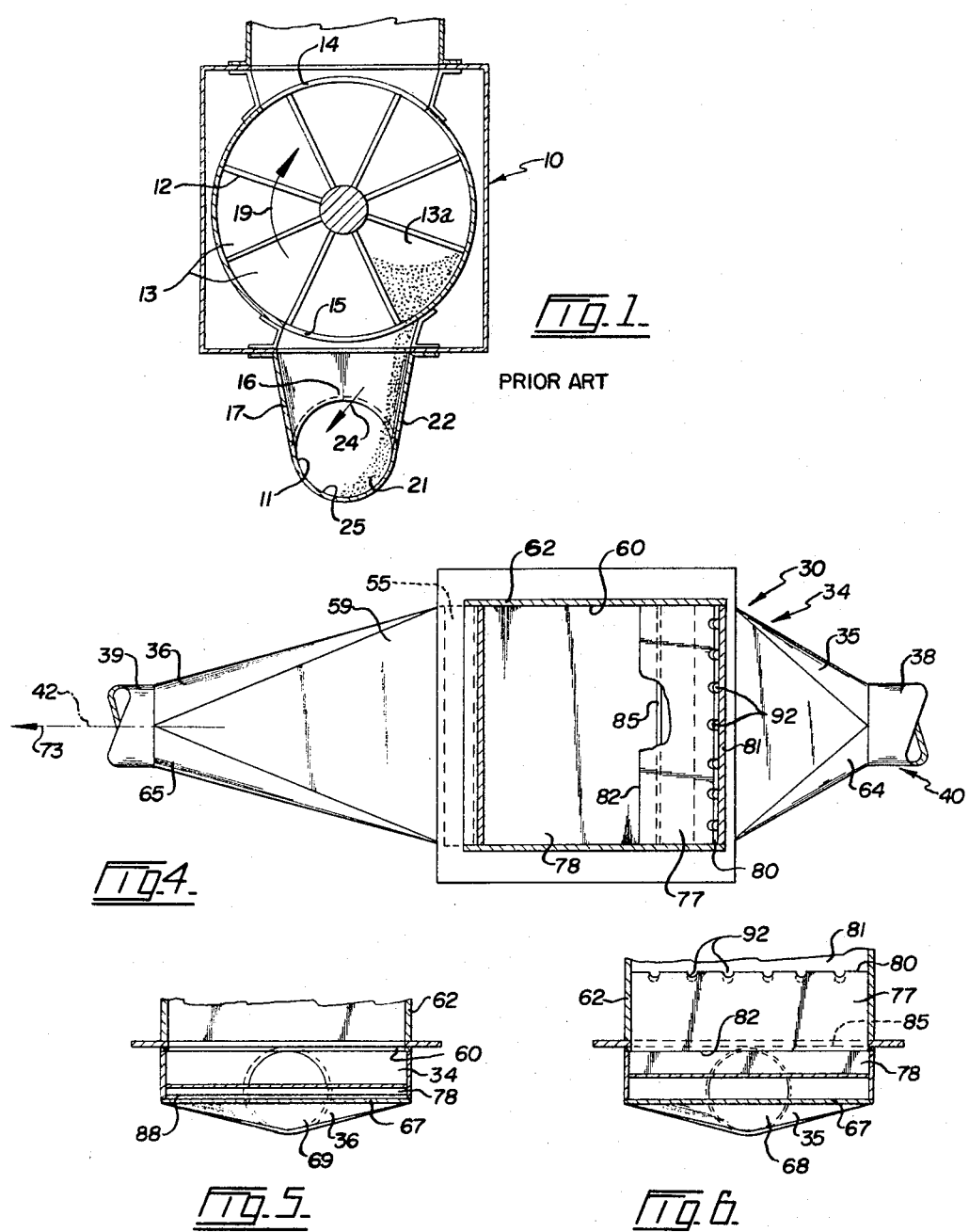

This invention relates to apparatus for feeding particulate material, such as wood chips, cement, grain, and the like into fluid conveyor pipe lines.

Rotary feeders are commonly used for introducing particulate material into fluid, and particularly air, conveyor pipe lines. The rotary feeder is well known, and it includes a rotor having pockets rotating within a housing which has an inlet and an outlet substantially opposite each other. The material is taken into each pocket of the rotor and transported from the inlet to the outlet through which it passes into the fluid conveyor lines. In the known systems employing rotary feeders, the axes of the feeder rotors extend substantially parallel to the longitudinal axes of the pipe lines. When the feeder is operating, the material is discharged from each pocket thereof in the form of a flat curtain because centrifugal force holds material to the flat blade of the rotor which forms a wall of the pocket until the point of discharge is reached, Thus, when a pocket starts to open into the feeder outlet and the pipe line, one edge of the curtain of material being discharged makes first contact with the fluid stream in the pipe line near a side of the latter and the material in this part is subjected to different treatment from the remainder of the material. This variation is gradual through the curtain of material from one edge to the other, and one of the results is an inefficient entrainment of the material in the fluid stream. A further disadvantage of the prior equipment is that when the material leaves the rotor pocket, it has a velocity of the order of the peripheral speed of the rotor, and this tends to cause the material to be thrown through the fluid stream on to the bottom of the pipe where fluid velocities are low and consequently entrainment difficult.

The apparatus according to the present invention includes a rotary feeder having its axis of rotation extending substantially at right angles to the longitudinal axis or centre line of the conveyor pipe line. The rotor rotates so as to discharge the material from the pockets thereof substantially in the direction of flow of the conveying fluid through the line and evenly across said line. Thus, each part of the curtain of material discharged from a rotor pocket is treated in the same way entirely across the pipe line. In addition, the material leaving the pocket at substantially the peripheral speed of the rotor is thrown substantially in the direction of movement of the fluid stream. The present apparatus also includes means for broadening the stream of thec onveyor fluid as it passes the rotary feeder so as to receive material from the full width of the pockets of the latter, means for increasing the velocity of the conveyor fluid at the point where the material is introduced thereinto, means for bringing each pocket into communication with the interior of the pipe line just before said pocket starts to discharge so that air entering the pocket from the line is not moving against the material flowing out of the pocket, means for preventing downward deflection of the material in the pipe line as said material is directed into it, means for directing the conveyor fluid immediately after the material is introduced into it substantially along the longitudinal axis or centre line of the pipe line, and means for injecting some air into the discharging material just before the latter enters the main fluid stream to partially fluidize the material before it reaches the main stream.

Figure 2:
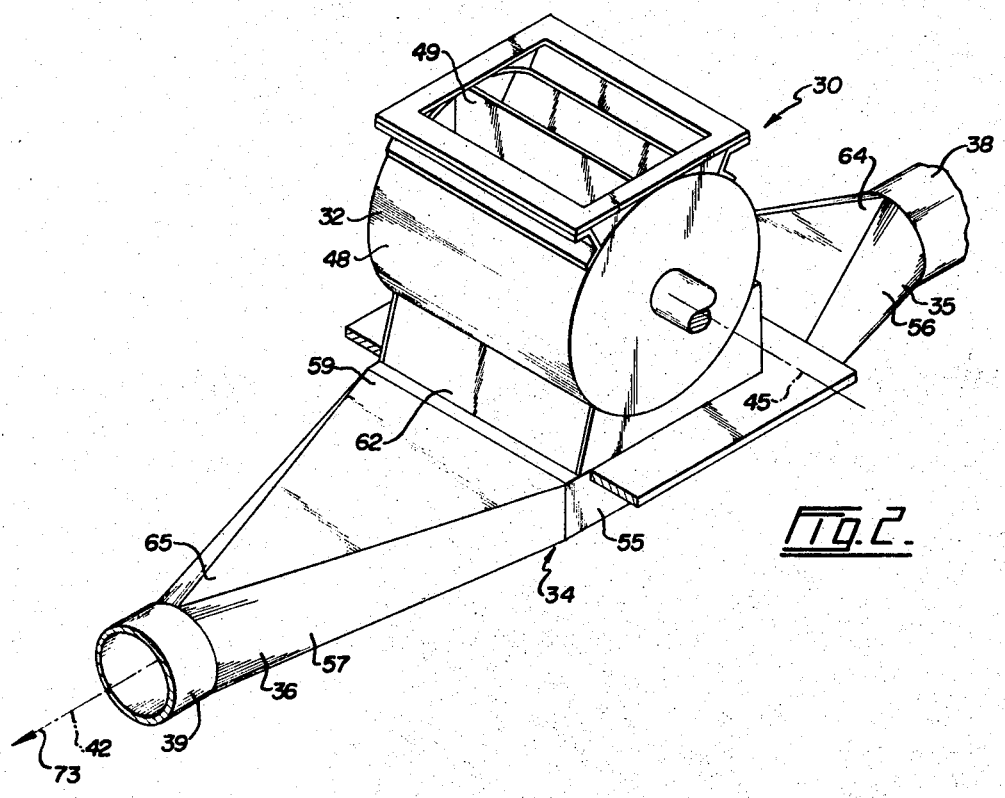
Figure 3:
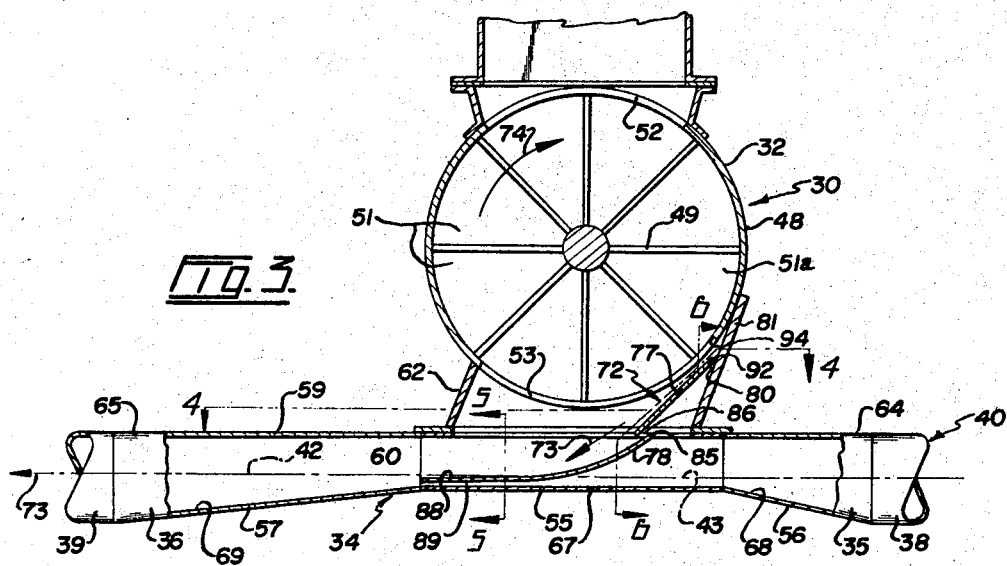

A preferred form of the invention is illustrated, by way of example, in the accompanying drawings, in which:

FIGURE 1 is a diagrammatic cross section through a rotary feeder and pipe line of the prior art, FIGURE 2 is an isometric view of particulate material feeding apparatus according to the present invention, FIGURE 3 is a longitudinal section through the apparatus of FIGURE 2, FIGURE 4 is a horizontal section taken on the line 4—4 of FIGURE 3, and FIGURES 5 and 6 are fragmentary vertical sections taken respectively on the lines 5—5 and 6—6 of FIGURE 3.

Referring to the drawings, FIGURE 1 diagrammatically illustrates a rotary feeder and conveyor pipe line arrangement of the prior art. The rotary feeder 10 directs particulate material downwardly into a fluid conveyor pipe line 11. The feeder includes a rotor 12 having a plurality of radial pockets 13 which are adapted to carry material from the entrance 14 of the feeder to the outlet 15 thereof, said outlet being directly over an inlet 16 formed in the top of pipe line 11. A short conduit 17 extends between the feeder and the pipe line, and encompasses feeder outlet 15 and pipe inlet 16.

The rotor 12 rotates in the direction of arrow 19, and a curtain of particulate material 21 drops out of each pocket 13 as the latter moves into registry with outlet 15. The pocket 13a which is emptying into pipe 11 is not yet in complete registry with outlet 15 so that the curtain 21 of the particulate material is being directed into pipe 11 at side 22 thereof. As the pocket progresses across the feeder outlet, the curtain material moves across pipe 11. From this it will be realized that the particulate material being introduced into pipe line 11 is subjected to different fluid conditions as the curtain of material moves across the pipe. This results in an inefficient entrainment of the material in the fluid stream. Furthermore, as the material leaves the rotor pocket, it has a velocity in the direction of arrow 24 of the order of the peripheral speed of the rotor, and this tends to cause the material to be thrown through the fluid stream on to the bottom 25 of the pipe where the velocity of the fluid is relatively low and therefore entrainment comparatively difficult.

FIGURES 2 to 6 illustrate a preferred form of particulate feeding apparatus 30 in accordance with the present invention. This apparatus includes a rotary feeder 32 adapted to distribute particulate material into a distributor casing 34 having ends 35 and 36 adapted to be connected to pipes 38 and 39, respectively, of a fluid conveyor pipe line 40. The pipe line has a central longitudinal axis 42 which coincides with a longitudinal axis 43 of casing 34, and feeder 32 has a central axis 45 which is above and extends substantially at right angles to the combined axis 42, 43 of the pipe line and the casing.

Feeder 32 is a standard feeder and includes a housing 48 with a rotor 49 rotatably mounted therein, said rotor being rotatable around the feeder axis 45 by a suitable source of power, not shown. Rotor 49 has a plurality of radial pockets 51 therein adapted to transport particulate material from an entrance 52 of the feeder to an outlet 53 thereof.

Casing 34 preferably has a central section 55 and inlet and outlet sections 56 and 57 connected thereto and extending in opposite directions therefrom along axis 43, see FIGURE 3. Casing sections 55, 56 and 57 have a common flat top 59 which is parallel to axis 43. Central section 55 has an inlet opening 60 in the top thereof which is substantially aligned with outlet 53 of feeder 32. A conduit 62 extends from the bottom of feeder housing 38 to the top of casing section 55 and encompasses feeder outlet 53 and casing inlet opening 60. By referring to FIGURE 2, it will be seen that the central section 55 of the distributor casing and conduit 62 extend substantially the full width of rotor housing 48. Outlet 53 of the feeder and casing inlet 60 extend the width of rotor 49 and, consequently, the width of pockets 51.

Inlet and outlet sections 56 and 57 of the distributor casing have inner ends the some width as central section 55, and taper inwardly in directions extending away from said central section to outer ends 64 and 65 which are the same shape and size as and are connected to pipes 38 and 39 of conveyor pipe line 40. It is preferable to provide central section 55 with a bottom 67 which is substantially parallel with casing top 59 and is near and parallel with casing axis 43. Inlet and outlet sections 56 and 57 are formed with bottoms 68 and 69, respectively, which are inclined downwardly away from the central section to their outer ends 64 and 65, see FIGURE 3.

When the apparatus is in operation, conveying fluid, usually air, is pumped through pipe line 40 under pressure. This fluid travels through pipe 38, casing 34, and pipe 39. Central casing section 55 is wide relative to the pipe line, but is considerably shallower so that there is no material reduction in the velocity of the fluid as it travels through said central section beneath rotary feeder 32.

Baffle means 72 is provided in conduit 62 for directing particulate material from feeder pockets 51 into distributor casing 34 in the direction of movement of the fluid through said casing, said direction being indicated by arrow 73 in FIGURE 3. Rotor 49 rotates in the direction of arrow 74. Baffle means 72 comprises a plurality of successive inclined plates, and in this example, there are first and second plates 77 and 78. Plate 77 has an upper edge 80 at wall 81 of conduit 62 near the bottom of feeder housing 48, and said plate is inclined downwardly at a relatively steep angle and has a lower edge 82 positioned at the inlet opening 60 of casing 34. Lower baffle plate 78 is inclined at a shallower angle than plate 77 and extends from an upper end 85 which underlies upper plate end 82 and is spaced downwardly a little relative thereto to form a passage 86 therebetween. Lower plate 58 extends downwardly to a lower end 88 which is spaced a little above the central section bottom 67 to form therebetween a narrow passage or throat 89. Plate 78 may have a shallow curve therein extending longitudinally thereof, as shown, or it may be just a flat inclined plate. The upper end 80 of upper plate 77 has one or more, and preferably a plurality of openings 92 therein, see FIGURE 4, said openings being located near the edge 94 of feeder outlet 53 where rotor pockets 51 start to open into said outlet. As an alternative, instead of openings 92, end 80 of the upper plate can be spaced a little from the adjacent conduit wall to form a narrow opening extending across the conduit and rotor.

During the operation of apparatus 30, conveying fluid, such as air, flows through pipe line 40 in the direction of arrow 73 and through casing 34 longitudially thereof, while feeder rotor 49 rotates in the direction of arrow 74. During rotation of the rotor, particulate material flows downwardly through feeder inlet 52 into rotor pockets 51 as the latter move past said inlet. These pockets move the particulate material around housing 48, and as each pocket registers with outlet 53, the particulate material is discharged through said outlet on to baffle means 72. The particulate material which is pressed against the bottom of the pocket by centrifugal force flows downwardly in a curtain over the baffle means, so that it is moving in the direction of travel of the conveying medium when it enters casing 34, which actually forms part of the conveyor pipe line. As baffle plates 77 and 78 and central casing section 55 extend the full width of rotor pockets 51, the material is subjected to substantially the same fluid conditions completely across the distributor casing. As the particulate material flows downwardly over baffle plates 77 and 78, some of the conveying medium flows through passage 86 between said plates to mix with this material and to start fluidizing it. The particulate material is directed off the lower end of plate 78 into the stream of fluid which is passing through narrow passage or throat 89 so that said fluid has increased velocity at the point where the particulate material is introduced into it. In addition, this introduction takes place substantially along the longitudinal axis 43 of the distributor casing which coincides with the pipe line axis 42 so that the material is directed along the centre line of the conveyor pipe line, and not along the bottom of the latter.

By referring to FIGURE 3, it will be seen that pocket 51a of the rotor is just starting to register with the feeder outlet 53, and this is immediately above openings 92 in the upper edge of baffle plate 77. The conveying medium expands through these openings and enters the pocket the moment the latter starts to register with the outlet so that the pressure in the pocket is brought up to that of the conveyor system just before the particulate material starts to flow downwardly out of the pocket. This has the advantage over the prior systems in that the fluid entering the pocket first does not move against the flow of particulate material out of the pocket to disturb the distribution thereof across the apparatus.

Some of the advantages of apparatus 30 over the prior art are as follows:

(1) The centrifugal action caused by the rotation of rotor 49 discharges particulate material from the rotor pockets generally in the direction of flow of the conveying fluid.

(2) The conveying fluid stream is fanned out in the area where the particulate material is introduced thereinto so that the material is subjected to the same fluid conditions completely across the apparatus and the rotor pockets as it flows into the fluid stream.

(3) The pressure in each rotor pocket is balanced with that in the pipe line just before the material flows out of said pocket.

(4) The particulate material is directed into the conveying fluid in an area where the velocity of the latter has been increased beyond the normal velocity of the fluid in the pipe line.

(5) The particulate material is partially fluidized as it travels from the rotor pockets to the point of introduction into the main fluid stream.

(6) The particulate material is directed into the fluid stream substantially along the centre line of the conveyor pipe.

(7) Practically no downward component is imparted to the particulate material where it is introduced into the fluid stream.

I claim:

1. Apparatus for feeding particulate material into fluid conveyor pipe line, comprising a rotary feeder having an outlet at the bottom and extending across substantially the width thereof, a distributor casing spaced below the feeder and having an inlet opening substantially the same size as and aligned with said outlet, a conduit extending downwardly from the feeder encompassing the feeder outlet and the casing inlet, said casing having a longitudinal axis extending substantially at right angles to the axis of rotation of the feeder and being adapted to be connected in a conveyor pipe line so that conveying fluid will travel along said longitudinal axis, and a plurality of successive inclined baffle plates extending from near the feeder outlet downwardly through the conduit into the casing to direct material from said outlet into the casing and to discharge the material in the latter in the direction of movement of fluid therethrough, the first plate of said successive plates having an upper end where each pocket starts to discharge into the feeder outlet and having at least one opening therein near said upper end through which the interior of the casing communicates with each feeder pocket moving over said first plate, each plate having a lower end overlapping and spaced above an upper end of the next following plate, and the lower end of the last plate being near said longitudinal axis of the casing and being spaced above a bottom of the casing to form with said bottom a throat through which the fluid flows at increased velocity.

2. Feeding apparatus as claimed in claim 1 in which said plates extend into a central section of the casing, said casing including inlet and outlet sections extending in opposite dirtctions along the casing longitudinal axis away from the central section, said inlet and outlet sections having inner ends the same width as the central section and tapering inwardly in a lateral direction to outer ends of substantially the same size as the conveyor pipe to which said casing is to be connected.

3. Feeding apparatus as claimed in claim 2 in which the longitudinal axis of the casing is positioned to coincide with the longitudinal axis of the conveyor pipe, and said central section has a bottom spaced a little below the casing axis and said inlet and outlet sections have bottoms inclined downwardly in directions away from said central section bottom.

4. Apparatus for feeding particulate material into fluid conveyor pipe line, comprising a cylindrical housing, a rotor rotatably mounted in the housing for rotation around a central axis and having a plurality of radial pockets adapted to transport particulate material from an entrance in a top of the housing to an outlet in a bottom of the housing, a distributor casing at the botom of the housing having an inlet opening at the top thereof in communication with the housing outlet, said casing having a longitudinal axis extending substantially at right angles to the axis of rotation of the rotor and being adapted to be connected in a conveyor pipe line so that conveying fluid will travel along said longitudinal axis, and baffle means at the housing outlet inclined from where each pocket starts to discharge particulate material and extending into and along said casing in the direction of movement of fluid therethrough and having an end terminating above a bottom of the casing, said pockets discharging in the direction of rotation of the rotor the particulate material through the outlet on to the inclined baffle means so that said material flows over the baffle means and into conveying fluid travelling beneath and past said baffle means end, said baffle means comprising successive inclined plates extending from the outlet of the housing into and along the distributor casing, each plate having a lower end overlapping and spaced above an upper end of the next following plate, whereby conveying fluid can flow between said plates into the particulate material moving over the plates, and the first plate of said successive plates having at least one opening therein near an upper end thereof through which the interior of the casing communicates with each feeder pocket moving over said first plate, said upper end of the first plate being positioned where each pocket starts to discharge into the feeder outlet.

References Cited

UNITED STATES PATENTS

| 1,779,264 | 10/1930 | Seehusen | 302—49 X |
| 1,789,692 | 1/1931 | Rosencrants | 302—49 |
| 1,844,172 | 2/1932 | Moore | 302—49 |
| 2,099,315 | 11/1936 | Prochazka. | |
| 3,151,784 | 10/1964 | Tailor | 222—368 |

FOREIGN PATENTS 811,239   4/1959   Great Britain.

RICHARD E. AEGERTER, *Primary Examiner.*

M. L. AJEMAN, *Assistant Examiner.*